United States Patent
Bai et al.

(10) Patent No.: US 8,097,376 B2
(45) Date of Patent: Jan. 17, 2012

(54) FUEL CELL SYSTEM COMPRISING MODULAR DESIGN FEATURES

(75) Inventors: Dingrong Bai, Dorval (CA); Jean-Guy Chouinard, Ville St-Laurent (CA); David Elkaim, Ville St-Laurent (CA)

(73) Assignee: Hyteon, Inc., Laval, Quebec (CA)

( * ) Notice: Subject to any disclaimer, the term of this patent is extended or adjusted under 35 U.S.C. 154(b) by 0 days.

(21) Appl. No.: 12/903,742

(22) Filed: Oct. 13, 2010

(65) Prior Publication Data

US 2011/0027675 A1    Feb. 3, 2011

Related U.S. Application Data

(63) Continuation of application No. 11/061,739, filed on Feb. 22, 2005.

(51) Int. Cl.
*H01M 8/24* (2006.01)
*H01M 2/38* (2006.01)

(52) U.S. Cl. ......... 429/452; 429/454; 429/456; 429/471

(58) Field of Classification Search ...................... 429/26
See application file for complete search history.

(56) References Cited

U.S. PATENT DOCUMENTS

| 6,077,620 A * | 6/2000 | Pettit .............................. 429/425 |
| 6,627,339 B2 * | 9/2003 | Haltiner, Jr. .................. 429/440 |
| 6,989,651 B1 * | 1/2006 | Arikara et al. ................ 320/116 |
| 2002/0150809 A1 * | 10/2002 | Hammerschmidt et al. ..... 429/34 |
| 2002/0168560 A1 * | 11/2002 | Mukerjee et al. ............... 429/38 |
| 2003/0138688 A1 * | 7/2003 | Hattori et al. ................... 429/34 |

* cited by examiner

*Primary Examiner* — Barbara Gilliam
*Assistant Examiner* — Steven Scully
(74) *Attorney, Agent, or Firm* — Norton Rose OR LLP

(57) ABSTRACT

There is described a fuel cell power system including a fuel processor subsystem, a fuel cell subsystem, and a power conditioning subsystem. The fuel processor subsystem comprises a main module for producing hydrogen rich streams from a hydrocarbon fuel, a balance of plant module for auxiliary components, and a control and electronic module for monitoring and controlling the fuel processor subsystem. The fuel cell subsystem comprises a main module for generation of electric power and thermal energy from hydrogen rich streams produced by the fuel processor module and air, a balance of plant module for auxiliary components, and a control and electronic module for monitoring and controlling the fuel cell subsystem. Each module has individual components attached thereto, the modules being designed and manufactured separately and assembled together to form the respective subsystems.

11 Claims, 8 Drawing Sheets

FUEL CELL SYSTEM COMPRISING MODULAR DESIGN FEATURES

CROSS-REFERENCE TO RELATED APPLICATIONS

The present application is a continuation application of U.S. patent application bearing Ser. No. 11/061,739, filed on Feb. 22, 2005, which is related to commonly assigned pending U.S. patent application entitled "Integrated Fuel Cell Power Module", filed on Sep. 24, 2004 and bearing Ser. No. 10/948,794, the contents of which are hereby incorporated by reference.

TECHNICAL FIELD

The present invention relates to devices which produce an electrical current by means of a chemical reaction or change in physical state, and more specifically, electrochemical fuel cell power generation systems comprising multiple subsystems including fuel processing, fuel cell stack, power conditioning, electronics and controls as well as the components of balance of plant.

BACKGROUND

Fuel Cells (FC's) are electrochemical devices that directly convert the chemical energy of a fuel into electricity. In contrast to energy storage batteries, fuel cells operate continuously as long as they are provided with reactant gases. In the case of hydrogen/oxygen fuel cells such as proton exchange membrane fuel cells, which are the focus of most research activities today, the only by-product is water and heat if pure hydrogen is used. The high efficiency of fuel cells and the prospects of generating electricity without pollution have made them a serious candidate to power the next generation of vehicles, houses and mobile devices. More recently, focus of fuel cell development has extended to remote power supply and applications, in which the current battery technology reduces availability because of high recharging times compared to a short period of power supply (e.g. cellular phones).

There are basically three major applications of fuel cells, namely, transportation, stationary and portable powers. In the case of transportation applications, pure hydrogen appears to be the most desirable fuel rather than on-board hydrogen production from hydrocarbon fuels, given the factors such as complexity, cost and slow start-up. This suggests that a fuel cell power system without fuel processing is most appropriate for transportation applications. In the case of stationary applications, especially in the low power range (<10 kW), two types of application, i.e. residential and backup power (or uninterruptible power units) are typical, with the former being generally installed with both a fuel processor and a fuel cell power system, and the latter only a fuel cell power system. Depending on the applications, fuel cell manufacturers have been putting their resources on either transportation, residential or backup. The products developed and manufactured in such cases cannot be transferable, i.e. each product requires a separate, lengthy and costly process of development, manufacturing and assembly.

Still, one of the most important issues impeding the commercialization of fuel cells is the cost. Besides the material, the complexity in the present designs shares a significant portion of the high cost. As it is well known in the field, a fuel cell power plant commonly comprises of hundreds (if not thousands) of components, with all of these components being properly connected, integrated, and housed in a chamber. It is a common feature that these multiple components have been made to best utilize the space inside the chamber in order to make the fuel cell system more compact. However, this feature has led to poor manufacturability, poor accessibility for assembling and poor serviceability. It is often the case that the whole system or subsystem (such as fuel processor, fuel cell stack) must be replaced even though there is only one part that has actually failed.

SUMMARY

It is therefore an objective of the present invention to provide a fuel cell system and a method to design and manufacture the same.

According to the present invention, the fuel cell system will be suitable as a stand-alone product for hydrogen production, pure hydrogen based transportation and backup power systems and fossil fuel residential applications as a result of disclosed modular design features. The functionally grouped and mechanically integrated modules can be separately manufactured, and serviced. Once manufactured, these modules can be easily installed and integrated to form a fuel processor, a fuel cell backup power system, or a residential fuel cell combined heat and power system. It provides the great degree of flexibility in manufacturing, assembly, and service. Each module can be easily replaced once it fails without sacrificing the entire system.

While this invention will be discussed mostly in relation to a Proton Exchange Membrane Fuel Cells (PEMFC), operated at either commonly referred low-temperature (e.g. <100° C.) or high-temperature (e.g. 120-250° C.) conditions, it is also applicable to other types of fuel cells such as alkaline fuel cell (AFC), phosphoric acid fuel cell (PAFC), molten carbonate fuel cell (MCFC), and solid oxide fuel cell (SOFC).

The present invention discloses a fuel cell system that is comprised of functionally grouped and mechanically integrated modules at all levels of system, subsystem and components, with the objective to increase the manufacturability, assembling ability and serviceability. Another objective is to increase the simplicity, and compactness of fuel cell systems. Yet another objective is to reduce the costs associated with fuel cell manufacturing, assembly, maintenance and service. Still another objective is to provide a method that allows quick development of various fuel cell products, e.g. fossil fuel residential or stationary CHP units, direct hydrogen fueled backup power units, and hydrogen production fuel processor.

The fuel cell power generation system is an integrated package from some or all of four major subsystems including fuel process subsystem, fuel cell subsystem, power conditioning subsystem and heat recovery subsystem. Furthermore, the fuel processor subsystem consists of three modules: fuel processor module, balance of plant module and electronics and controls module. Similarly, the fuel cell subsystem is made of three modules: fuel cell module, balance of plant module and electronics and controls module. The fuel processor module and fuel cell module each contain several separately manufactured and serviceable component modules, which are appropriately integrated. Linkage between the modules can be flexible and/or quick-connectable type. All the modules from component, subsystem to system are designed and constructed separately, and once manufactured they are linked or somehow stacked together according to the flow scheme to form an integrated compact device. The modular design feature as presented in this invention allows ease of manufacturing, leak testing, assembling and maintenance. It also allows repairing or replacing individual modules easily and cost effectively, once a failure has been detected.

In accordance with the present invention, there is provided a fuel cell power system including a fuel processor subsystem, a fuel cell subsystem, and a power conditioning subsystem. The fuel processor subsystem comprises a main module for producing hydrogen rich streams from a hydrocarbon fuel, a balance of plant module for auxiliary components, and a control and electronic module for monitoring and controlling the fuel processor subsystem. The fuel cell subsystem comprises a main module for generation of electric power and thermal energy from hydrogen rich streams produced by the fuel processor module and air, a balance of plant module for auxiliary components, and a control and electronic module for monitoring and controlling the fuel cell subsystem. Each module has individual components attached thereto, the modules being designed and manufactured separately and assembled together to form the respective subsystems.

In accordance with a second broad aspect, there is provided a fuel cell power system including a fuel processor module, a fuel cell module, and a power conditioning module, wherein a balance of plant module regroups all system balance of plant components and is separate from the fuel processor module, fuel cell module, and power conditioning module; and an electrical and control module regroups all electrical and control devices to control and operate the system and is separate from the fuel processor module, fuel cell module, and power conditioning module.

In accordance with a further broad aspect, there is provided a fuel cell power system including a fuel processor subsystem, a fuel cell subsystem, and a power conditioning subsystem, characterized in that: the fuel processor subsystem comprises a first main module for producing hydrogen rich streams from a hydrocarbon fuel, a first balance of plant module for auxiliary components, and a first control and electronic module for monitoring and controlling the fuel processor subsystem, the first main module, the first balance of plant module, and the first control and electronic module being physically regrouped together; and the fuel cell subsystem comprises a second main module for generation of electric power and thermal energy from hydrogen rich streams produced by the fuel processor module and air, a second balance of plant module for auxiliary components, and a second control and electronic module for monitoring and controlling the fuel cell subsystem, the second main module, the second balance of plant module, and the second control and electronic module being physically regrouped together, the fuel processor subsystem and the fuel cell subsystem being physically disposed separately from one another within the fuel cell power system; each the module having individual components attached thereto, the modules being designed and manufactured separately and assembled together to form the respective subsystems, each the module removable from the fuel cell power system as a single unit independently.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
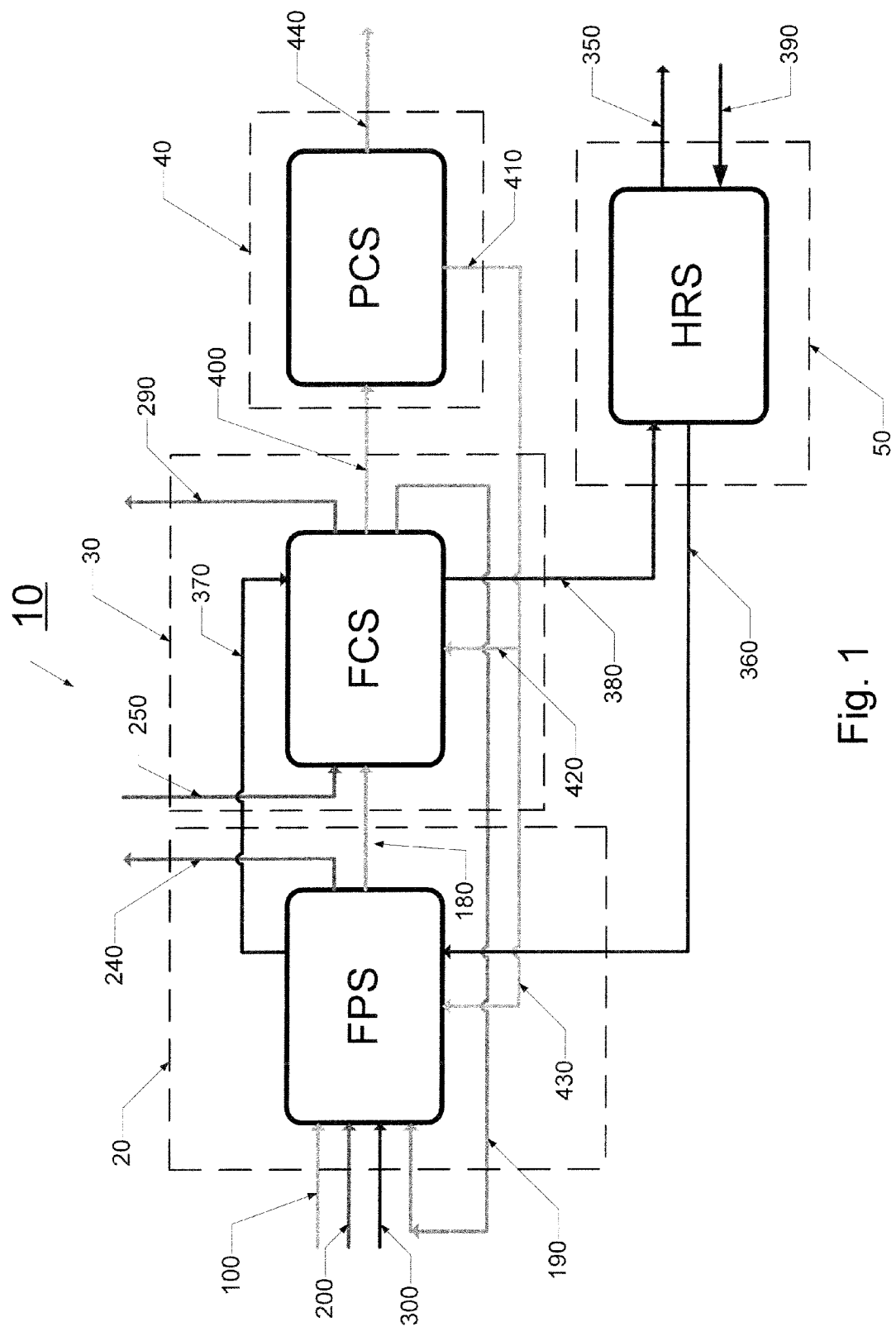
FIG. 1. is a block diagram of the fuel cell power generation system in accordance with a preferred embodiment of the present invention.

FIG. 1 shows a fuel cell power system 10 comprising of four major subsystems, namely, a fuel processor subsystem (FPS) 20, a fuel cell subsystem (FCS) 30, a power conditioning subsystem (PCS) 40 and a heat recovery subsystem (HRS) 50. If designed and manufactured separately, FPS 20, FCS 30 and PCS 40 can be independent devices for hydrogen production and pure hydrogen based fuel cell power generators. When combined in a way such as shown in FIG. 1, it becomes an integrated fossil fuel based fuel cell power system for either small or large stationary applications. When they are further integrated with HRS 50, it can provide both heat and power for users. This provides a modular design at the system level.

Figures 2A, 2B:
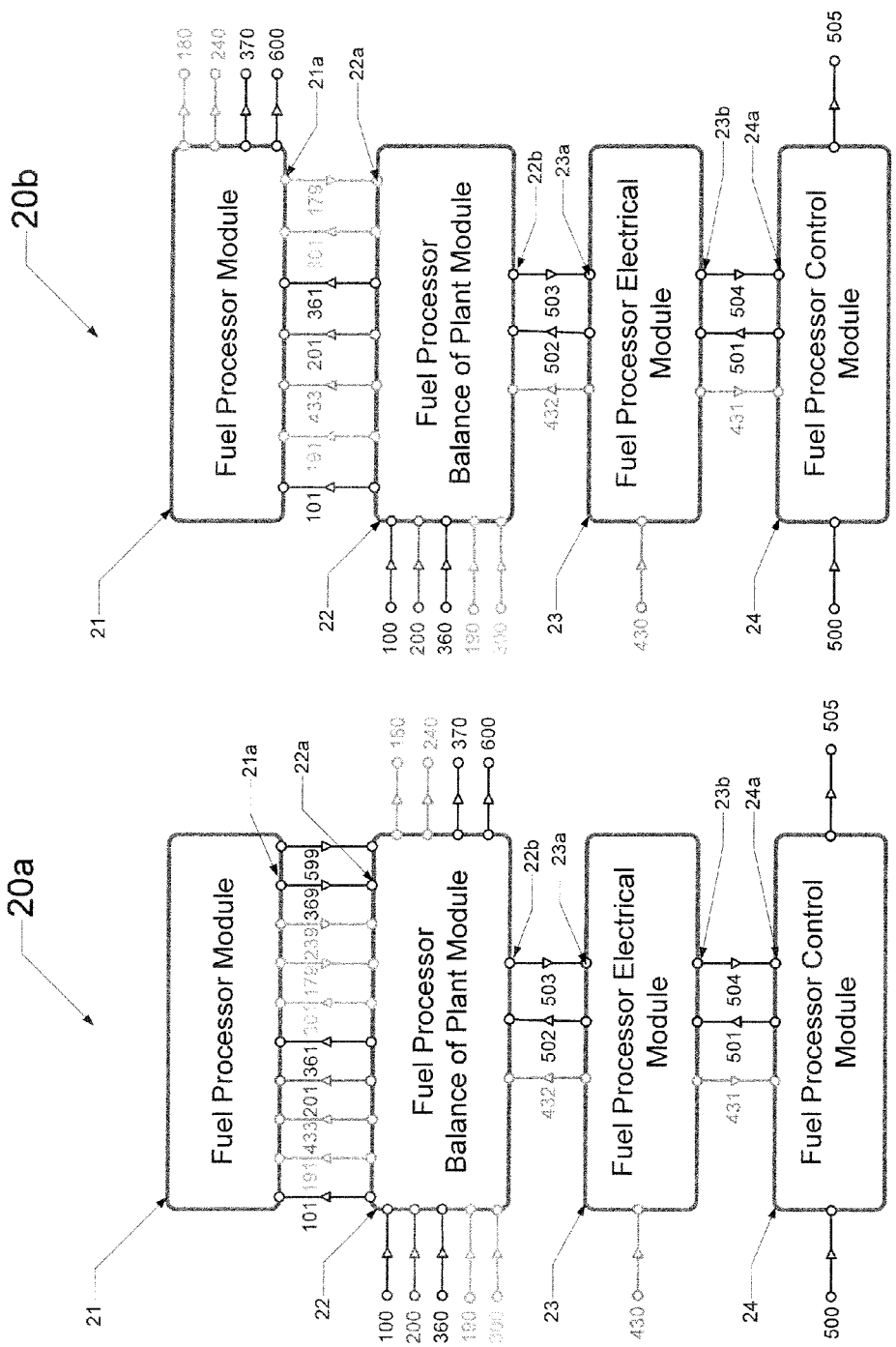
FIG. 2a illustrates the separate modules that make up the fuel processor subsystem in accordance with a preferred embodiment of the present invention.
FIG. 2b illustrates the separate modules that make up the fuel processor subsystem in accordance with another preferred embodiment of the present invention.

For the fuel processor subsystem module, as schematically illustrated in FIG. 2a and FIG. 2b, it further consists of four general sub-modules, namely, a fuel processor module 21, in which all fuel processor sub-components such as steam reformer, shift reactor, desulfurizer, preferential oxidation reactor (PROX) and heat exchangers are independently manufactured, and interconnected according to the fuel processing flow and thermal management in a preferably compact fashion;

a fuel processor balance of plant module 22, which is a platform on which all the auxiliary components in relation to the fuel processing, such as hand valves, solenoid valves, pressure regulators, check valves, compressors, flowmeters, and filters, are installed and connected. There are also connecting ports in predetermined locations for quick connections of streams from the supply sources and to the above mentioned fuel processor module 21;

an electrical module 23, which controls and coordinates the fuel processor operation by collectively installed all electrical devices such as I/O boards;

a control module 24, which monitors and controls the fuel processing subsystem operation, including data acquisition and display (GUI).

On FPS 20*a*, there is a fuel stream 100 supplying the fuel (e.g. natural gas, liquefied petroleum gas), and a water stream 300 for use in hydrocarbon reforming. Air 200 is shown here only for illustration purposes because it will actually be taken from surrounding space. There is another stream, anode off gas recycling stream 190, which supplies the majority of burning fuel for the fuel processor in the case that the fuel processor is part of the fuel cell power system. In the case of stand-alone, this stream will be compensated by a burning fuel stream which is generally the same as, and will be split within the fuel processor balance of plant module 22 from, fuel 100 supplied to the reformer. In case of cogeneration applications, the cogeneration water 360 from HRS 50 can be supplied to the FPS 20 to recover the available heat from combustion flue gases. All incoming fluid streams (100, 200, 360, 190, 300) and exhausting streams (hydrogen rich reformate stream 180, flue gas 240, warm cogeneration water 370, and water condensate 600) are connected to and from the ports on fuel processor balance of plant module 22 of FPS 20*a*. Fluids are fluidly communicating between fuel processor module 21 and balance of plant module 22 by means of quick connectable, either rigid or flexible tubes between ports 21*a* and 22*a* (i.e. hydrocarbon fuel 101, anode off gas 191, air 201, cogeneration water 361, deionized water 301, reformate 179, flue gas 239, warm cogeneration water 369, water condensate 599). The electric power 430, preferred as DC power, used to operate the electrical components collectively installed on electrical module 23 and controllers 24 of FPS 20 can be either supplied from an external power source (FPS stand-alone) or from the PCS 40 that converts and conditions the DC power output from the fuel cell stack (FPS integrated with FCS and PCS). Part of the electrical power 432 is supplied to operate the fuel processor balance of plant components on 22 that require electrical power such as solenoid valves, air blowers, compressors, and electrical heaters. And the rest of electrical power 431 is supplied to fuel processor control module, which may receive a control signal 500 from, and send a control signal 505 to the central control system of fuel cell system 10. The control signals 501 and 504 can be passed between fuel processor control module 24 and fuel processor electrical module 23, and signals 503 and 504 can be passed between fuel processor electrical module 23 and fuel processor balance of plant module 22.

FIG. 2*b* illustrates an alternative to FIG. 2*a*, in which the exhausting streams are directly connected from fuel processor module 21 of FPS 20*b*. This may be advantageous over 20*a*, because the fluid communication between fuel processor module 21 and fuel processor balance of plant module 22 can be simpler.

The produced hydrogen rich gas 180 can be used in any way, or directly supplied to a fuel cell power subsystem 30 (30*a* or 30*b*). As for FPS 20, the FCS 30 can also be made up of four independently manufactured sub-modules, namely, a fuel cell module 31, which is an entirely integrated compact assembly including at lease one fuel cell stack, at least one fuel cell heat exchanger, a fuel cell stack cooling loop with a coolant expansion tank and a coolant filter, at least one cathode blower, and necessary water condensate drainage valves. All these components are mechanically manufactured and integrated in a preferred compact fashion;

a fuel cell balance of plant module 32, which is a mechanical platform on which all necessary auxiliary components (such as valves, regulators, pumps, etc.) to make the fuel cell module operable and functional are collectively installed. There are also connecting ports in predetermined locations for quick connections of streams from the supply sources and to the fuel cell module 31;

a fuel cell electrical module 33, a mechanical platform where all electrical and control devices such as power supplies, switches, delays, and I/O boards, are collectively installed, and a fuel cell control module 34, which monitors and controls the fuel cell subsystem operation, including data acquisition and display (GUI).

In case of direct hydrogen systems, the stream 180 can be replaced by a pure hydrogen source. Again, an air stream 250 to cathode of the fuel cell stack is shown here only for illustration purpose. The water stream 370, flowing from either the FPS 20 or directly from HRS 50, enters the FCS 30 to remove the heat produced by the electrochemical reactions of fuel cells. The incoming fluid streams 180, 250 and 370 are supplied to fuel cell subsystem 30 by means of quick connectable, rigid of flexible, tubes to ports on fuel cell balance of plant module 32, from where they are sent to fuel cell module 31 by collecting either rigid or flexible tubes 181, 251, and 371 between ports 31*a* and 32*a*. A stack coolant stream, 700 and 701, may flow between fuel cell module 31 and fuel cell balance of plant module 32. The residue fuel 182 flowing out the fuel cell stack 31 is sent to fuel cell balance of plant module 32, from where it can be discharged or recycled to fuel processor subsystem 20 as anode off gas stream 190. The fuel cell module generally includes a fuel cell stack having a plurality of fuel cells, at least one heat exchanger to transfer fuel cell produced heat to cogeneration water, and possibly humidifiers for humidifying fuel stream and/or cathode air. The fuel cell balance of plant module generally includes all components such as air blowers, pumps, filters, and solenoid valves necessary for operating fuel cell system. The warmed water 380, which connects to stream 379 from fuel cell module 31, flows out the fuel cell balance of plant module 32 of FCS 30 and returns to HRS 50 while useful heat can be utilized in any appropriate way by, for instance, flowing water streams 350 and 390. On the FCS 30, there is still another output port for discharging a water condensate stream 601 that may be produced in fuel cell module 31 and flows as stream 602. The DC power 400 produced is generally subject to a converter and power conditioner PCS 40. The electric power 420 used to operate the electronics collectively installed on fuel cell electrical module 33 and controllers collectively installed on fuel cell control module 34 of FCS 30 is generally supplied from the PCS 40, which produces the power 440 for end users. The electrical power 421 and 422, required by the fuel cell control module 34 and fuel cell balance of plant module 32 respectively, are supplied from fuel cell electrical module 33. There may be electrical power supply 423 to the fuel cell module 31. The fuel cell control module, when stands alone, sends to, and receives from, fuel cell electrical module 33 the control signals 511 and 514 to control operations of electrical components there. Similarly, there may have control signals 512 and 513 between fuel cell electrical module and fuel cell balance of plant module for control electrical components operation.

Figures 3A, 3B:
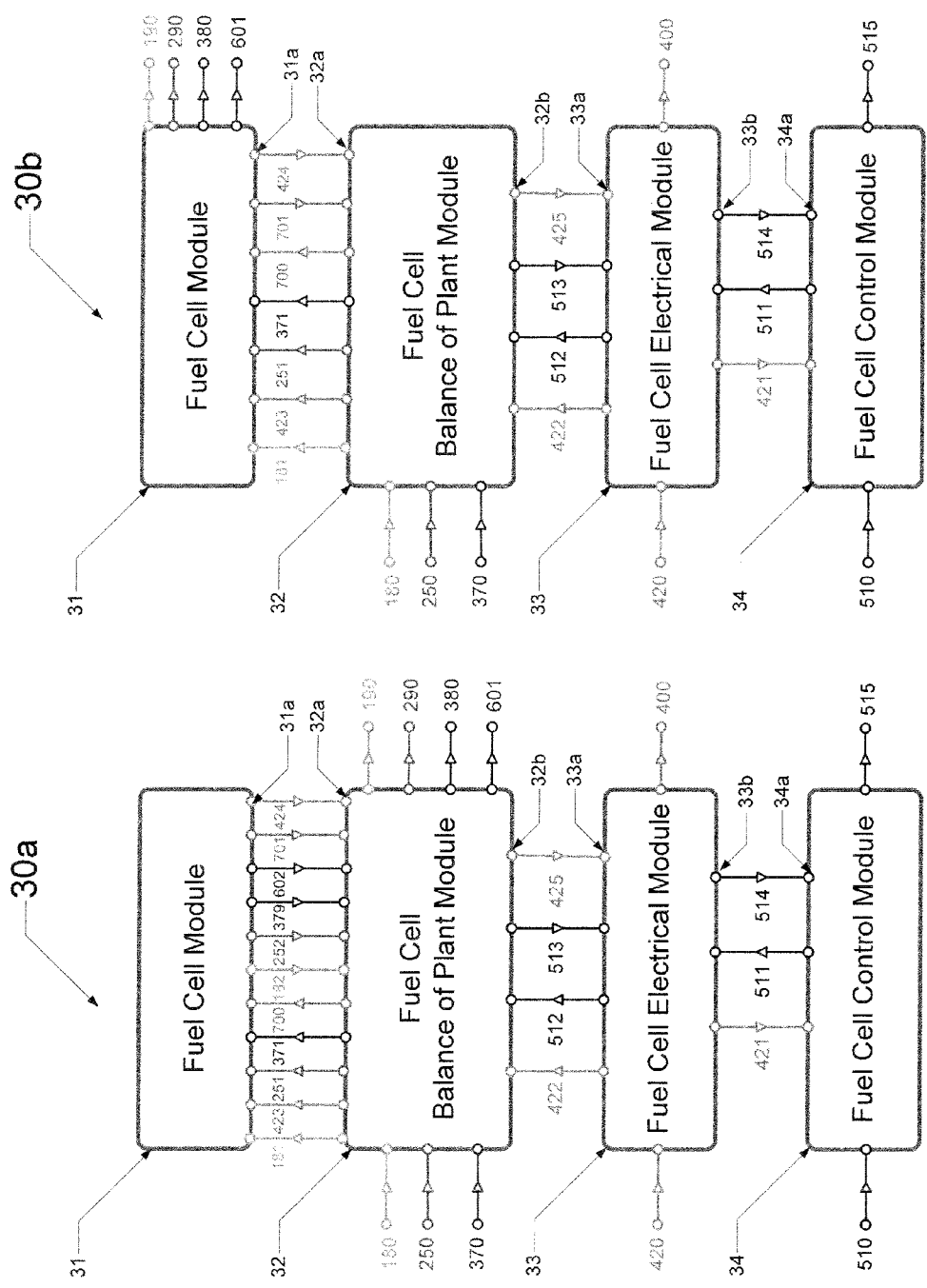
FIG. 3a illustrates the separate modules that make up the fuel cell subsystem in accordance with a preferred embodiment of the present invention.
FIG. 3b illustrates the separate modules that make up the fuel cell subsystem in accordance with another preferred embodiment of the present invention.

Similarly, the fuel cell subsystem 30 can be constructed as other alternatives to one illustrated in FIG. 3*a*. One of such alternatives is illustrated in FIG. 3*b*, in which the output of the fluid streams from fuel cell subsystem can be from the fuel cell module 31.

Figure 4:
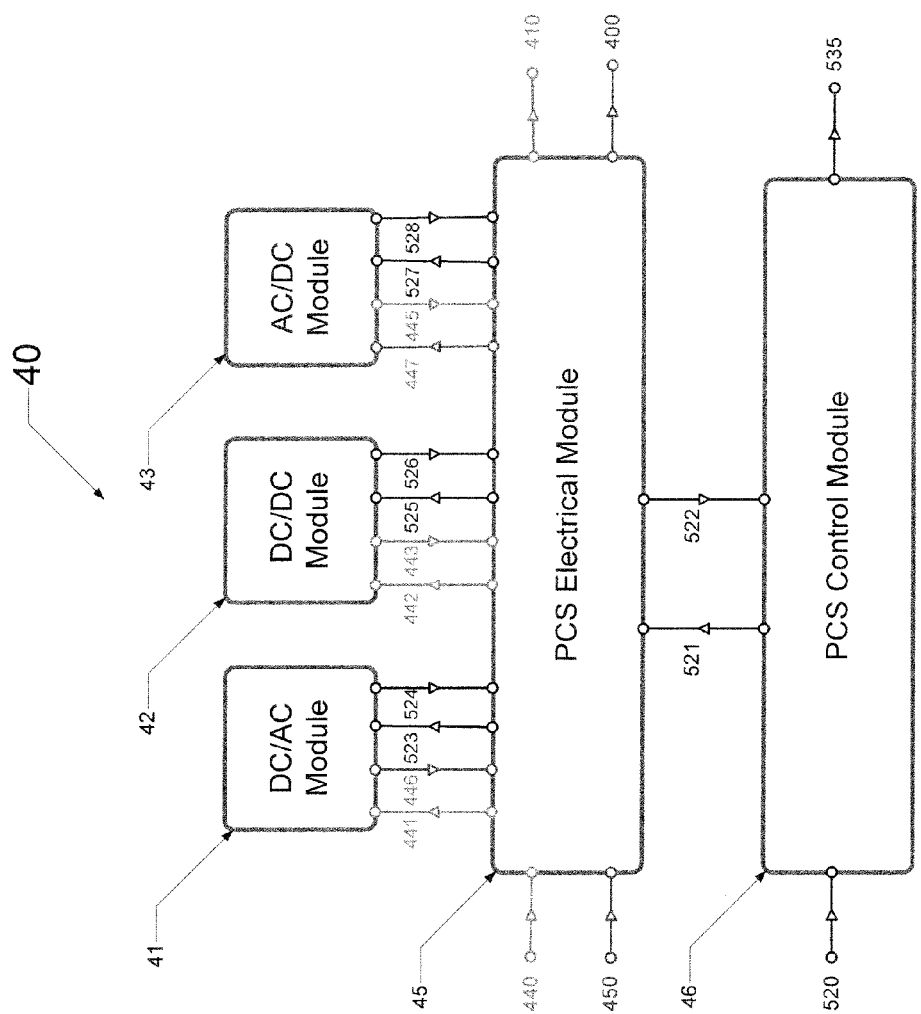
FIG. 4 illustrates the separate modules that make up the power conditioning subsystem in accordance with a preferred embodiment of the present invention.

FIG. 4 illustrates a modular power conditioning subsystem 40. On PCS 40, it first has a control module 46 which controls the PCS operation. The control module 46 may be communicating with a centralized control system of fuel cell system 10 by receiving a control signal 520 and sending a control signal 535. The control module 46 also sends to, and receives from the electrical module 45 the control signals 521 and 522. There is also an electrical module 45 which collectively installs all electronic devices such as I/O boards, power sources and switches. Interacting with the PCS control module 46 and electrical module 45, there generally have three modular components, namely:

- a DC/AC converter module, which converts the fuel cell produced DC power into AC power for end use. The DC/AC converter module may have an electrical input 441 and an electrical output 446, and it may receive a control signal 523 and send a feedback control signal 524.
- a DC/DC converter module, which converts the fuel cell produced unregulated DC power to regulated DC power, which is then possibly used for fuel cell system auxiliaries. The DC/DC converter module may have an electrical input 442 and an electrical output 443, and it may receive a control signal 525 and send a feedback control signal 526.
- an AC/DC converter module, which will convert the AC power from commercial grid to regulated DC power for use of fuel cell system auxiliaries. The AC/DC conversion is often necessary during fuel cell system start up when there is no electrical power production from fuel cell system. On the AC/DC converter module, there may have an electrical input 447 and an electrical output 445, and it may receive a control signal 527 and send a feedback control signal 528.

On PCS electrical module 45, there is generally a DC electrical power input port to receive the fuel cell produced DC power 440, and another input port to receive the AC power 450 from commercial grid. There is also an output port to deliver the converted AC power 400 for end use, and another output port for the regulated DC power 410, either converted from fuel cell produced DC power or from commercial grid AC power.

Figure 5:
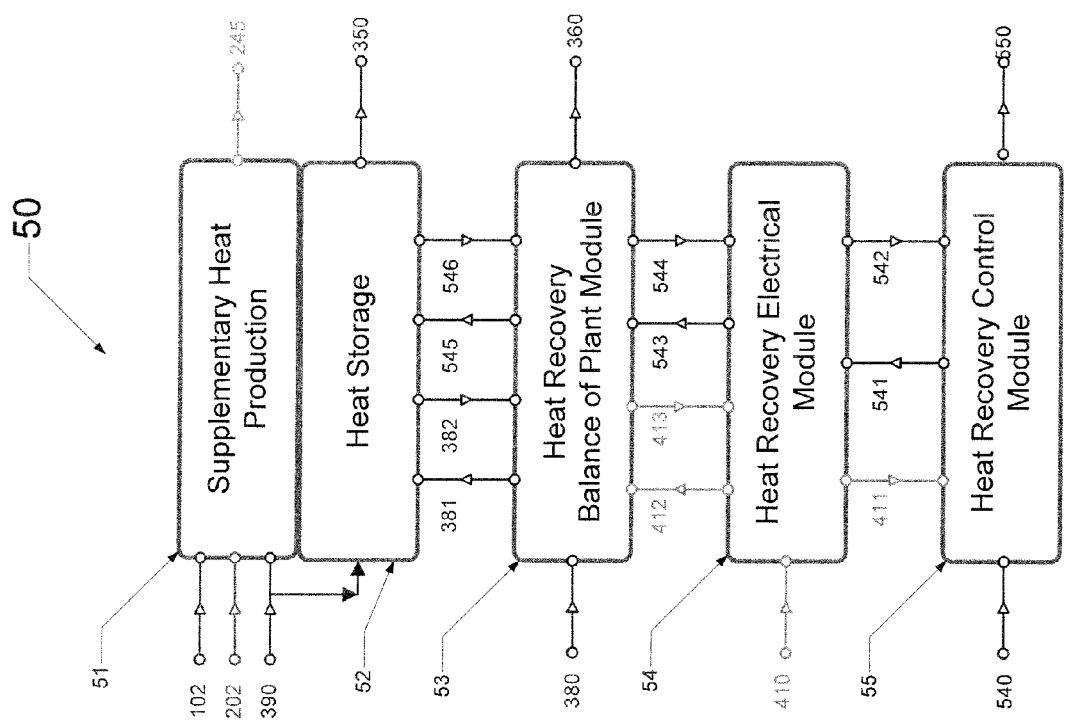
FIG. 5 illustrates the separate modules that make up the heat recovery subsystem in accordance with a preferred embodiment of the present invention.

FIG. 5 shows a modular design of heat recovery subsystem according to one of the preferred embodiments of the present invention. The HRS 50 can generally be constructed by assembling several independently manufactured sub-modules, namely:

- a heat recovery control module 55, which controls the HRS operation by collectively installed devices for data acquisition and display. The control module 55 may receive a control signal 540 from, and send a control signal 550 to, a centralized control subsystem of fuel cell system 10. The control system 55 is powered by preferably a DC power 411 supplied from an electrical module 54, and it may send a control signal 541 to, and receive a control signal 542 from the electrical module 54.
- an electrical module 54, which collectively houses all electronic devices for operating the HRS 50. The electrical module 54 is powered by preferably a DC power 410, and outputs a portion of the power 411 to the control module 55 and another portion 412 to a heat recovery balance of plant module 53. On the module 54, there may be input ports and output ports for sending and receiving control signals 541 to 544.
- a heat recovery balance of plant module 53, which is a platform to house, install all necessary auxiliaries such as valves, pumps and regulators in order to make the HRS 50 functionally operational. The hot water stream 380 from the fuel cell system 10 returns to the heat recovery balance of plant module 53, from where it further flows to a heat storage module (generally a thermal storage tank) 52 by collecting the stream 381. The circulation cogeneration water 382 from the storage module 52 is send back to the fuel cell system via the heat recovery balance of plant module 53 as water stream 360. Between the heat recovery balance of plant module 53 and the heat storage module 52 there may have control signals 545 and 546 for operation control;
- a heat storage module 52, which generally is a water storage tank in which the heat recovered by the HRS is temporally stored. Whenever there is a thermal demand from the end use, the heat stored will be withdrawn by supplying a hot water stream 350. A city water stream 390 may be supplied to the storage module to make up the water withdraw in any preferred method;
- a supplementary heat production module 51, which, in most cases, includes a supplementary gas burner, and may preferably be integrated with the heat storage module 52. The supplementary heat production module 51 is generally provided to supply the heat demands that are beyond the thermal production capacity of fuel cell system 10, or that are not available during the moments of fuel cell operations. A city water stream 390, a fuel stream 102, and an air stream 202 can be supplied to the supplementary heat production module 51 for heat production.

Figure 6:
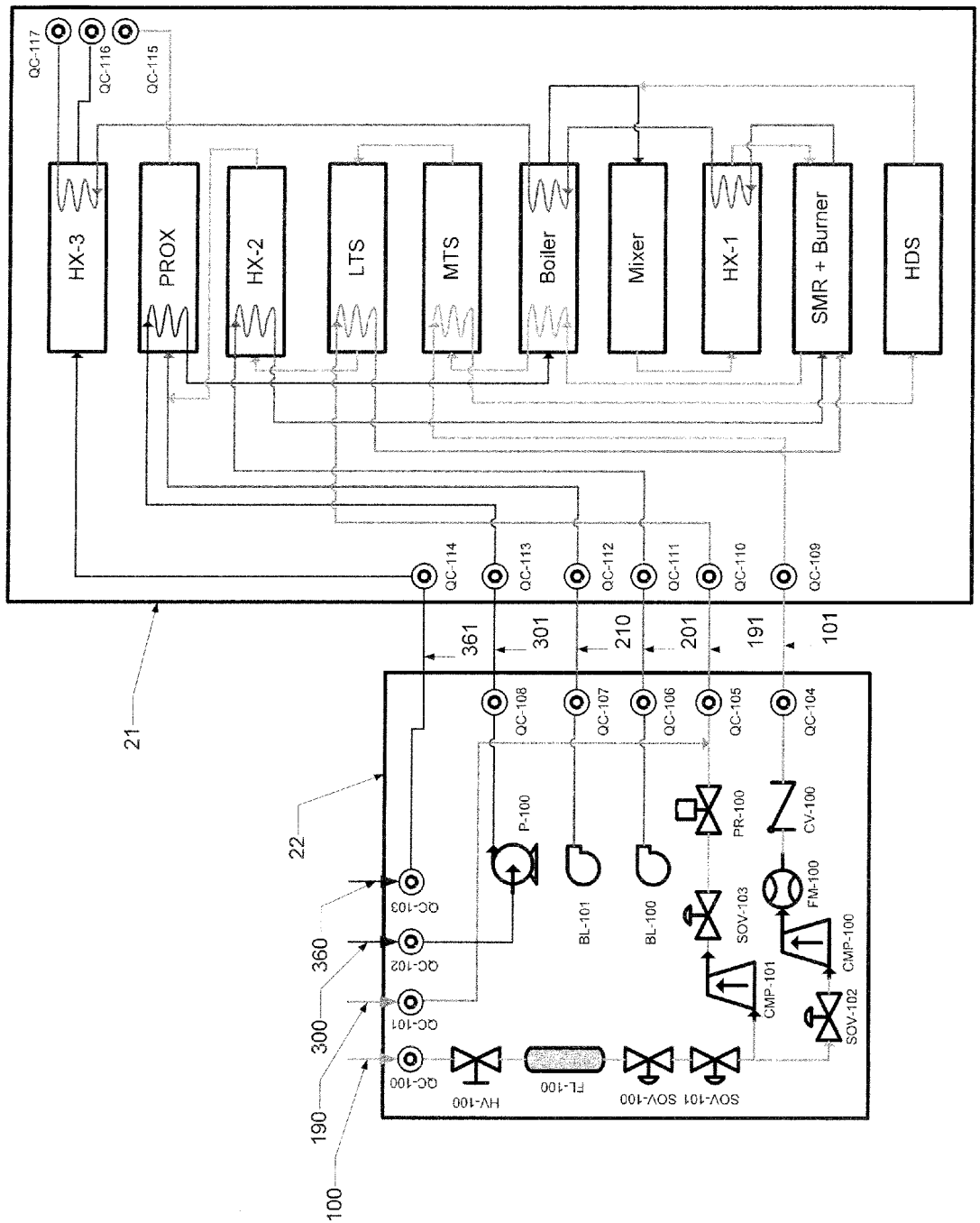
FIG. 6 illustrates the modular design at the component level for the fuel processor subsystem in accordance with a preferred embodiment of the present invention.
Figure 7:
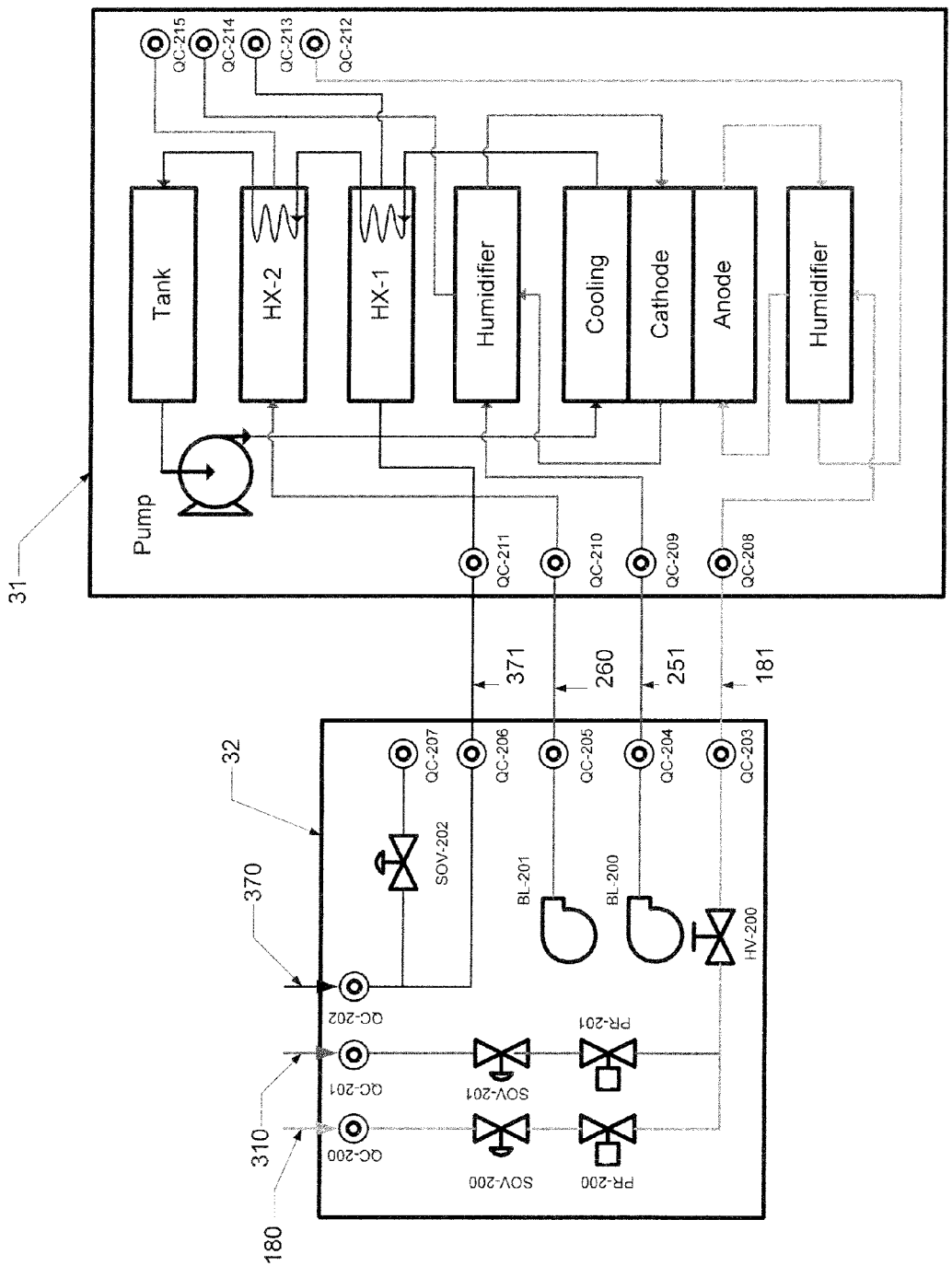
FIG. 7 illustrates the modular design at the component level for the fuel cell subsystem in accordance with a preferred embodiment of the present invention.

Now referring further to FIGS. 6 and 7 for the concepts of modular design at subsystem levels. In FIG. 6, the fuel processor subsystem FPS 20 is made of four modules, i.e. fuel processor module 21, a balance of plant panel module 22 and a fuel processor related electrical module and a control module (not shown). All these modules can be manufactured separately, and once finished they can be simply integrated by quick connections. The fuel processor module 21 is preferably a mechanically integrated, compact fuel processor with only input (QC-109 to QC-114) and output ports (QC-115 to QC-117) for fluids. As will be described later, the fuel processor 21 generally consists of multiple devices such as reformer, burner, steam generator, water-gas shift reactor, preferential oxidizer and heat exchangers, which are all connected and integrated inside the fuel processor module 21. One will only view the input ports and output ports for streams of hydrogen rich gas 180, combustion flue gas exhaust 240 and warmed cogeneration water 370. On the fuel processor balance of plant panel module 22, all fuel processor accessories such as valves, flow meters, filters, check valves, pressure regulators, compressors are preferably arranged in a two-dimensional fashion. The components on the panel 22 can be connected preferably by flexible tubing. The panel 22 holds all components of the balance of plant and the collecting ports for accepting input streams of fuel 100, anode off gas recycling 190, cogeneration water 360 and water to boiler 300. It also has the connectors for connection of gas streams to the fuel processor module 21 through preferably flexible tubing 101 for fuel, 191 for anode off gas recycling, 201 for burner air, 210 for PROX air, 361 for cogeneration water and 301 for water to boiler. All the ports are preferably of the quick-connection type, which allow quick and easy installation. The modules 23 and 24 contain all power electronics and controls, connecting to the panel 22 by preferably a cable and interface connectors.

Similar to fuel processor subsystem module shown in FIG. 2, fuel cell subsystem module 30, as shown in FIG. 7, is further divided into three modules: fuel cell module 31, the module of balance of plant 32 and fuel cell electronics and controls modules 33 and 34. Again, all these modules can be manufactured separately, and once finished they can be simply integrated by quick connections. The fuel cell module 31 is preferably a mechanically integrated, compact subsystem with only input and output ports for fluids, and inside there are sub-modules of fuel cell stack, humidifier, heat exchangers, coolant tank and coolant circulation pump. However, only the input connection ports and output ports can be seen. On the balance of plant panel module 32, all fuel cell accessories such as valves, pressure regulators, air blowers (compressors) are preferably arranged and installed in a two-dimensional fashion. The hydrogen or hydrogen rich reformate 180, nitrogen (used for stack purging generally) 310, and the cogeneration water 370 are connected to the panel 32, and after proper flow arrangement they, together with the cathode air 251 and cooling air 260, are sent to the fuel cell module 31 through the connection ports 32a on the panel 32. All the ports are preferably of the quick-connection type, which allow quick and easy installation. The modules 33 and 34 contain all power electronics and controls, connecting to the panel 32 by preferably a cable and interface connectors.

The modular design concept at subsystem level described above can be further illustrated in FIGS. 6 and 7, which demonstrate the modular design concept at component level. It should be understood that they are provided here only for illustration purpose and in practice, the flow arrangement and the involved components can be determined by the actual process and application characteristics, which are beyond the scope of this invention.

FIG. 6 shows one example of the embodiments according to the present invention with regard to the fuel processor module 21 and its balance of plant module 22. As already mentioned earlier, there are for input ports on the module 22 to be connected to the external streams: QC-100 for fuel 100, QC-101 for anode off gas recycling 190, QC-102 for water to boiler 300 and QC-103 for cogeneration water 360. A hand valve HV-100 is positioned right after the fuel is entered through QC-100, which will be manually opened or shutdown for security needs of system operations. Fuel is passed through a dust filter FL-100 before flowing through two successively installed solenoid valves SOV-100 and SOV-101, which in this case are installed based on safety regulations, and will be actually controlled by a regulatory recognized reliable electronic controller (not shown). The fuel is then split into two streams; one is to be sent to the reformer as feed, and the other to be supplied as supplementary fuel to anode off gas as burner fuel. On the feed line, there may be installed a solenoid valve SOV-102, a compressor CPM-100 to lift the feed supply pressure high enough to overcome the downstream flow resistance (pressure drop), a flow meter FM-100 to measure and monitor the feed flow rate, and a check valve CV-100 to prevent any possible backflow, before the feed stream reaching to the outlet connector QC-104. The supplementary fuel line will likely see a compressor CMP-101, a solenoid valve SOV-103, and a pressure regulator PR-100, before it is connected to the output connector QC-105. The supplementary fuel flow rate is adjusted by a control mechanism likely based on burner temperature and on the anode off gas flow rate that is supplied from the connector QC-101 and mixed with the fuel prior to the QC-105. On the panel module 24, there may also be installed one water pump P-100 to deliver the water to the boiler, and two air blowers BL-100 and BL-101 to supply the air separately to burner, and preferential oxidizer (PROX) reactor, all inside the fuel processor module 21.

It should be understood that all the components within the module 24 can be mounted on a two-dimensional panel or plate; therefore it can also be referred to as plate of balance of plant. This module can be manufactured separately, and the components can be installed and connected independently. The module will be eventually installed on a system frame structure, which will integrate all the system modules into the desired product. The module will be easily removable from such a frame structure, and be repaired or replaced.

Now referring to the fuel processor module 21 in FIG. 6, there are six input connectors QC-109 to QC-114 to be connected with the panel module 22 for various streams input, and three output connectors QC-115 to QC-117 for exiting the streams. The fuel processor shown schematically herein is a stream reforming based process developed by the author of the present invention. The fuel processor consists of several key components, including a hydrodesulfurizer (HDS), an integrated steam reformer and burner (SMR+Burner), three heat exchangers (HX-1, HX-2, and HX-3), a desulfurized feed a superheated steam mixer, a steam boiler, a medium temperature water gas shift reactor (MTS), a low temperature water gas shift reactor (LTS), and a preferential oxidizer (PROX). All the components herein are preferably designed and constructed separately, and once manufactured they are linked or somehow stacked together according to the flow scheme to form an integrated compact device. This feature will allow ease of manufacturing, leak testing, and assembling. It also allows repairing or replacing individual components without destroying the entire fuel processor, once a failure has been detected in a component.

Now referring to FIG. 7 for fuel cell module 31 and its balance of plant module 32. Three connectors QC-200, QC-201 and QC-202 are placed on the panel module 32 to receive fuel stream 180, nitrogen stream 310 and cogeneration water 370. On each of the fuel and nitrogen line, there may be installed a solenoid valve (SOV-200 and SOV-201) and pressure regulator (PR-200 and PR-201). Before either fuel or nitrogen (only used when purging) is connected to the output connector QC-203, there is a hand valve HV-200 for manual control. Two air blowers or compressors BL-200 and BL-201 are installed on the panel to supply air to the cathode of the fuel cell stack and a backup air cooling heat exchanger HX-2, respectively. The cogeneration water from the connector QC-202 flows to the connector QC-206, while it might be partially or completely bypassed through a solenoid valve SOV-202 to the output connector QC-207, which eventually is connected to the stream after the output connector QC-213 on the fuel cell module 31.

The fuel cell module shown schematically in FIG. 7 is typical of the PEMFC system, which consists of several key components, including fuel cell stack having an anode, a cathode and a cooling side. There is an air humidifier, which humidifies the incoming cool and unsaturated air by exchanging humid and heat with the cathode exhausting air that is generally saturated at or near the stack temperature. There may also have another humidifier, in which the incoming dry hydrogen or semi-hydrated reformate can be humidified by exchanging humid and heat with the exhausting wet anode off gas. A heat exchanger HX-1 is placed to remove the heat that the stack produced to the cogeneration water. A second heat exchanger HX-2, which differs from the HX-1, is also designed to serve as a backup heat exchanger, i.e. to remove the extra heat not sufficiently removed by the HX-1, to ensure an appropriate temperature of coolant before it flows into the coolant tank. A coolant circulation pump circulates the coolant back to the stack. All these components are preferably designed and constructed separately, and once manufactured they are linked or somehow stacked together according to the flow scheme to form an integrated compact device.

One may remove the PROX reactor, and probably LTS, from the fuel processor module shown in FIG. 6, when the produced reformate is supplied to a high temperature membrane fuel cell, in which the fuel cell stack can safely be operated with reformate containing up to a few percentage CO (e.g. 5%), therefore only a high and/or medium temperature water gas shift reactor can satisfy this CO level requirement. For high temperature fuel cells, it is also possible to remove one or two humidifiers shown in FIG. 7 because humidification for high temperature membrane such as polybenzimidazoles (PBI) based is unnecessary. Instead, there may be an additional heat exchanger, arranged in a preferred way, to pre-heat the incoming cold air to close to the stack temperature, which is generally between 120 and 200° C.

Figure 8:
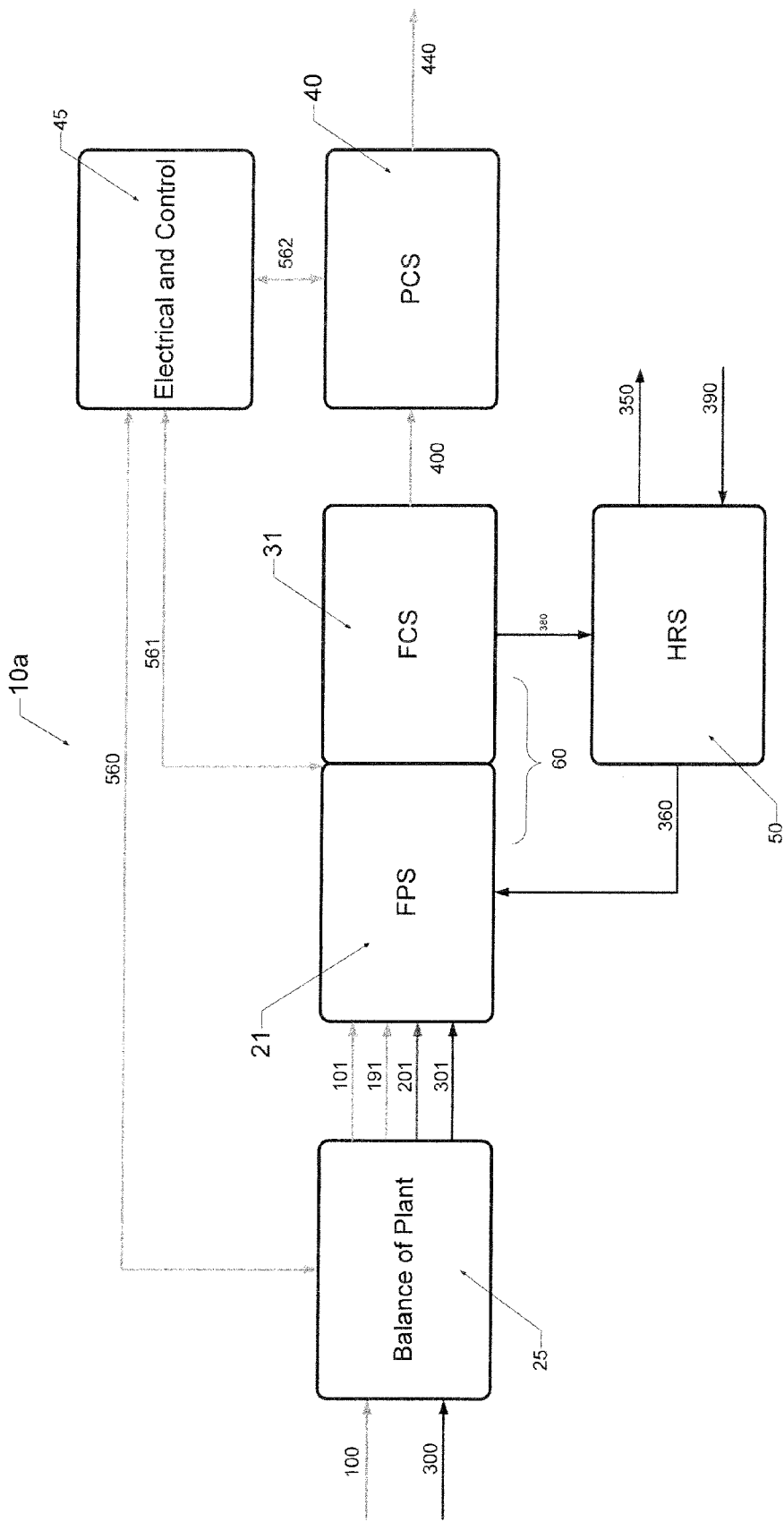
FIG. 8. is a block diagram of the fuel cell power generation system for a high-temperature system in accordance with a preferred embodiment of the present invention.

Furthermore, there may be other variations to the fuel cell power system 10 of FIG. 1, by separating, combining or rearranging the basic subsystems, modules and components based on the present invention. One such example is schematically shown in FIG. 8, which is one of the preferred embodiments in accordance with the present invention for a combined heat and power plant based on a steam reforming based fuel processor and a high temperature membrane based fuel cell stack. In FIG. 8, the fuel processor module 21 can be similar to what is shown in FIG. 6 but without LTS and PROX, and the fuel cell module 31 can be similar to what is shown in FIG. 7 but without two humidifiers, and they can be manufactured separately as they are for low temperature fuel cell systems. Given the fact that the MTS temperature is in the same range as the high temperature fuel cell stack (i.e. 160-200° C.), the fuel processor module 21 and fuel cell module 31 can even be designed and manufactured as an integral assembly 60 as shown in FIG. 8, in which the MTS is expected to be placed in the neighborhood of the fuel cell stack. Accordingly, the balance of plant modules 22 and 32 for fuel processor subsystem 20 and for fuel cell subsystem 30 can be integrated to form an integrated balance of plant module 25 in FIG. 8, and all the electrical and control modules shown in FIGS. 2, 3, 4 and 5 can be designed and manufactured as an integrated assembly 45. In such an arrangement, a steam reforming and high temperature fuel cell based CHP system 10a will include five major modules, namely, an electrical and control module, in which all electrical and control devices are collectively installed, to control and operate the CHP system by interacting with other system modules;

a balance of plant module, in which all system balance of plant components such as valves, blowers, compressors, regulators, filters and pumps are collectively installed. It receives a fuel stream 100 and a water stream 300 from external supplying sources, and sends a feed stream 101, a fuel stream 191, an air stream 201 and a water stream 301 to the combined fuel processor and fuel cell module 60. It may also receive electrical power and control signals from the electrical and control module 45 by preferably connecting with a cable 560;

a combined fuel processor and fuel cell module 60, in which hydrocarbon feed is first converted to a hydrogen rich reformate in fuel processor part 21, which is subsequently supplied to fuel cell 31 to react with air to generate electricity 400 and usable thermal energy, with the latter to be recovered by flowing a cogeneration stream 360 from, and 380 to, a heat recovery module 50. The combined fuel processor and fuel cell module 60 may receive an electrical power and a control signal from, and send a control signal to, the aforementioned electrical and control module 45 through a connecting cable 561;

a power conditioning module 40, which converts and conditions the fuel cell produced power 400 to generate an AC power 440 for end use. This module is essentially the same as one shown already in FIG. 4. The PCS module 50 is controlled by interacting with the electrical and control module 45 by connecting a cable 562; and a heat recovery module 50, which is essentially the same as one shown in FIG. 5.

The embodiments of the invention described above are intended to be exemplary only. The scope of the invention is therefore intended to be limited solely by the scope of the appended claims.

We claim:

1. A fuel cell power system including a fuel processor subsystem, a fuel cell subsystem, and a power conditioning subsystem, characterized in that:

said fuel processor subsystem comprises a first main module for producing hydrogen rich streams from a hydrocarbon fuel, a first balance of plant module for first auxiliary components, and a first control and electronic module for monitoring and controlling said fuel processor subsystem, said first main module, said first balance of plant module, and said first control and electronic module being physically regrouped together, said first balance of plant module comprising a first mechanical platform having the first auxiliary components and first quick connectors secured thereto; and said fuel cell subsystem comprises a second main module for generation of electric power and thermal energy from hydrogen rich streams produced by said fuel processor module and air, a second balance of plant module for second auxiliary components, and a second control and electronic module for monitoring and controlling said fuel cell subsystem, said second main module, said second balance of plant module, and said second control and electronic module being physically regrouped together, said fuel processor subsystem and said fuel cell subsystem being physically disposed separately from one another within said fuel cell power system, said second balance of plant module comprising a second mechanical platform haing the second auxiliary components and second quick connectors secured thereto, the first and second quick conectors each for connection of streams from supply sources and to the first and second main module, respectively;

each said module having individual components attached thereto, said modules being designed and manufactured separately and assembled together to form the respective subsystems, each said module removable from said fuel cell power system as a single unit independently.

2. The system as claimed in claim 1, wherein said power conditioning subsystem comprises a third control and electronic module for monitoring and controlling said power conditioning subsystem, and a third main module for converting DC power generated by said fuel cell subsystem into regulated DC and/or AC power, said third control and electronic module and said third main module being physically regrouped together.

3. The system as claimed in claim 1, wherein each one of said first control and electronic module and said second control and electronic module is composed of an electrical module for hardware components and a control module for software components.

4. The system as claimed in claim 1, further comprising a heat recovery subsystem.

5. The system as claimed in claim 4, wherein said heat recovery subsystem is comprised of a fourth main module for recovering thermal energy from said fuel processor subsystem and said fuel cell subsystem and supplying the recovered thermal energy to meet thermal energy demand, a heat recovery balance of plant module for auxiliary components, and a heat recovery control and electronic module for monitoring and controlling said heat recovery subsystem, said fourth main module, said heat recovery balance of plant module, and said heat recovery control and electronic module being physically regrouped together.

6. The system as claimed in claim 5, wherein said heat recovery subsystem also comprises a heat storage module for storing heat recovered by said heat recovery subsystem, and a supplementary heat production module to supply heat demands that are beyond the thermal production capacity of said system, said heat storage module and said supplementary heat production module being physically regrouped with said fourth main module, said heat recovery balance of plant module, and said heat recovery control and electronic module.

7. The system as claimed in claim 1, wherein said components on said first balance of plant module and said second balance of plant module are arranged in a two-dimensional fashion.

8. The system as claimed in claim 7, wherein said components are connected by flexible tubing.

9. The system as claimed in claim 1, wherein said fuel cell subsystem is a stack assembly of plates mechanically clamped together.

10. The system as claimed in claim 9, wherein all said plates in said stack assembly have a same cross-section.

11. The system as claimed in claim 10, wherein said stack assembly comprises of assemblies of plates for heat exchangers and humidifiers mechanically clamped together.

* * * * *